(12) United States Patent
Monserrat et al.

(10) Patent No.: US 12,321,217 B2
(45) Date of Patent: Jun. 3, 2025

(54) METHOD AND APPARATUS FOR MONITORING A PCIE NTB

(71) Applicant: Dell Products, L.P., Hopkinton, MA (US)

(72) Inventors: Ro Monserrat, Medfield, MA (US); Jonathan Krasner, Coventry, RI (US)

(73) Assignee: Dell Products, L.P., Hopkinton, MA (US)

( * ) Notice: Subject to any disclaimer, the term of this patent is extended or adjusted under 35 U.S.C. 154(b) by 325 days.

(21) Appl. No.: 18/172,394

(22) Filed: Feb. 22, 2023

(65) Prior Publication Data

US 2024/0281047 A1   Aug. 22, 2024

(51) Int. Cl.
  *G06F 1/3246* (2019.01)
  *G06F 9/48* (2006.01)
  *G06F 9/52* (2006.01)
  *G06F 13/40* (2006.01)

(52) U.S. Cl.
  CPC .......... *G06F 1/3246* (2013.01); *G06F 9/4881* (2013.01); *G06F 9/526* (2013.01); *G06F 13/4027* (2013.01); *G06F 2209/521* (2013.01); *G06F 2213/0026* (2013.01)

(58) Field of Classification Search
  CPC ...... G06F 1/3246; G06F 9/4881; G06F 9/526; G06F 13/4027; G06F 2209/521; G06F 2213/0026
  See application file for complete search history.

(56) References Cited

U.S. PATENT DOCUMENTS

| | | | | |
|---|---|---|---|---|
| 2010/0031078 A1* | 2/2010 | Foote | .................. | H04L 67/1095 713/310 |
| 2013/0238882 A1* | 9/2013 | Suzuki | ................ | G06F 11/1438 712/228 |
| 2017/0359243 A1* | 12/2017 | Deuri | ...................... | H04L 47/83 |
| 2018/0189126 A1* | 7/2018 | Sugimoto | ........... | G06F 11/0793 |
| 2020/0233826 A1* | 7/2020 | Thai | .................... | G06F 13/1668 |
| 2021/0117235 A1* | 4/2021 | Kronrod | ................ | G06F 9/526 |

* cited by examiner

*Primary Examiner* — Nimesh G Patel

(74) *Attorney, Agent, or Firm* — Anderson Gorecki LLP

(57) ABSTRACT

A pair of compute nodes, each having a separate PCIe root complex, are interconnected by a PCIe Non-Transparent Bridge (NTB). An instance of a NTB monitoring process is started for each root complex, and the CPU affinity of the NTB monitoring processes are set to cause each NTB monitoring process to be executed on CPU resources of each respective CPU root complex. The NTB monitoring process on a given root complex is allowed to sleep until a triggering event occurs that causes the NTB monitoring process to wake and determine the state of the NTB. One such triggering event is a failure of an atomicity algorithm on the compute node to obtain a lock on peer memory in connection with implementing an atomic read operation on the peer memory over the NTB.

15 Claims, 9 Drawing Sheets

Peer Failure Detected

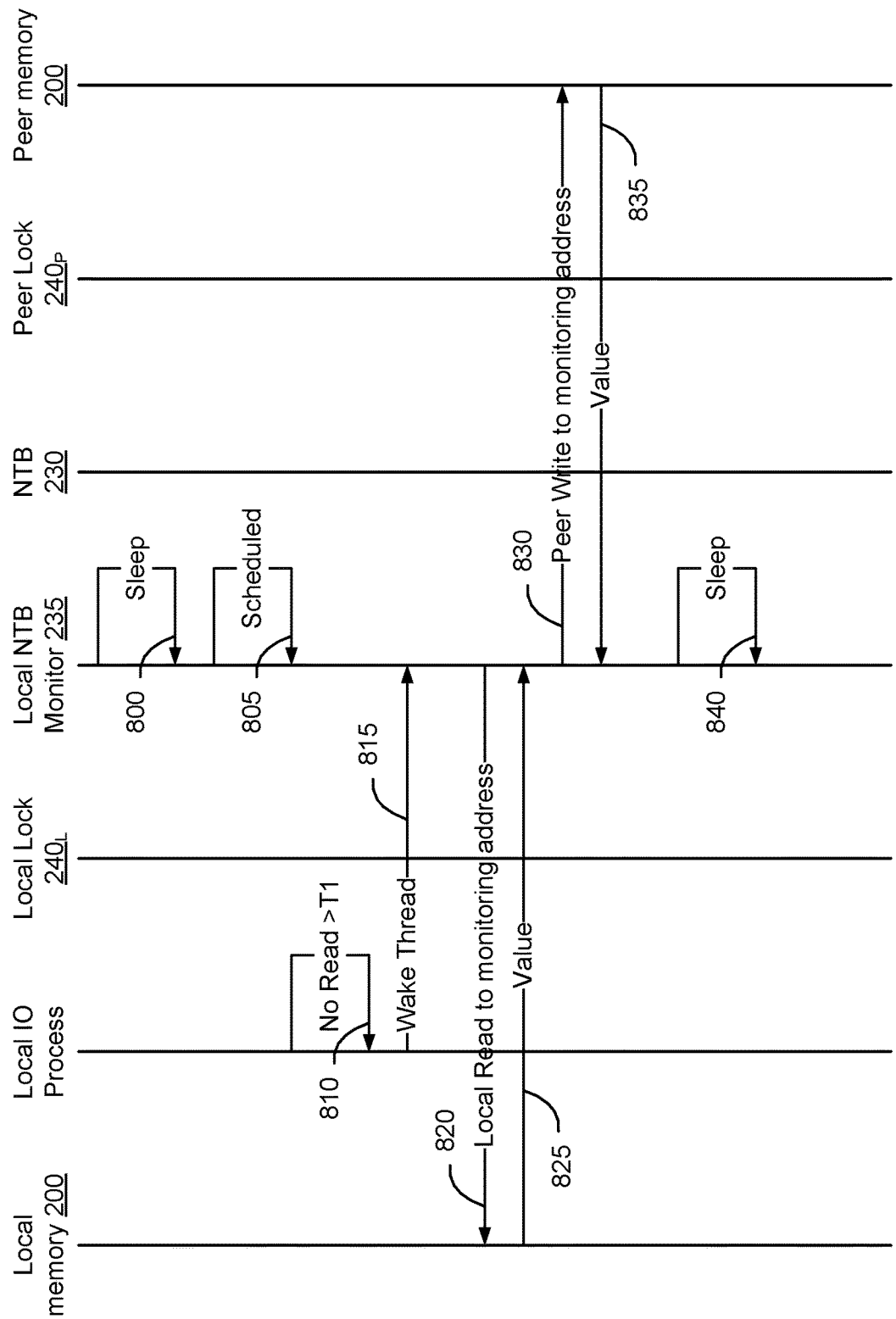

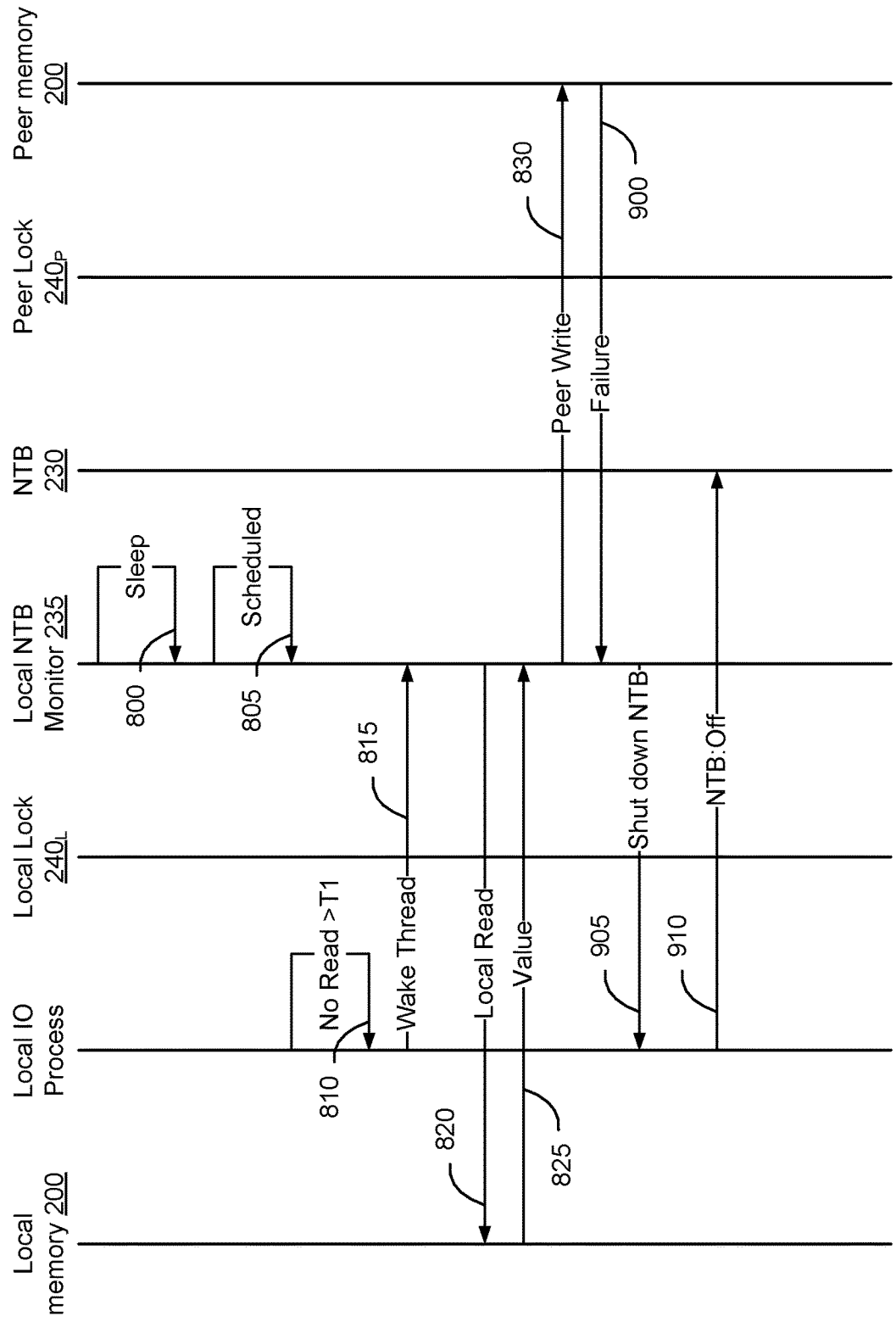

METHOD AND APPARATUS FOR MONITORING A PCIE NTB

FIELD

This disclosure relates to computing systems and related devices and methods, and, more particularly, to a method and apparatus for monitoring a Peripheral Component Interconnect Express (PCIe) Non-Transparent Bridge (NTB) interconnecting a pair of two compute nodes in a storage system.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A storage system has a pair of compute nodes, each of which is implemented to include a separate CPU root complex. The CPU root complexes are interconnected by Peripheral Component Interconnect Express (PCIe) Non-Transparent Bridges (NTB). Each compute node has memory connected to its respective CPU root complex. Each compute node can directly access the local memory connected to its CPU root complex and can directly access the memory of the peer compute node over the PCIe NTB.

To monitor the health of the PCIe NTBs interconnecting the root complexes, an instance of a NTB monitoring process is started for each root complex connected to a PCIe NTB that is to be monitored, and the CPU affinity of the processes are set such that a respective NTB monitoring process is required to be executed on CPU resources of each respective CPU root complex. By setting the affinity of the processes, it is possible to ensure that the NTB monitoring processes do not float between CPUs of different root complexes, thus preventing multiple NTB monitoring process from executing on one root complex while having no NTB monitoring processes executing on the other root complex.

In some embodiments, the NTB monitoring process on a given root complex is allowed to sleep until a triggering event occurs that causes the NTB monitoring process to wake. Example triggering events include a failure of an IO process on the root complex to obtain a lock on peer memory in connection with a read on the peer memory, IO inactivity for greater than a threshold period of time, or a scheduled NTB monitoring process event. By configuring the NTB monitoring process to wake in the event of a failure of an IO process on the root complex to obtain a lock on peer memory in connection with a read on the peer memory, it is possible to greatly reduce the frequency with which the scheduled events cause the NTB monitoring thread to execute. Reducing the frequency with which the NTB monitoring thread is required to be scheduled to execute enables the CPU cycles to be conserved and used by other processes in the storage engine.

In some embodiments, a method of monitoring for occurrence of a fatal error on a Peripheral Component Interconnect Express (PCIe) Non-Transparent Bridge (NTB) interconnecting two respective PCIe root complexes of two respective compute nodes, includes implementing a respective NTB monitoring process on each respective compute node, setting a core affinity for each respective NTB monitoring process to require the respective NTB monitoring process to execute on CPU resources on the respective root complex, and causing the NTB monitoring process to sleep during normal operation until occurrence of a triggering event. The method further includes implementing atomic peer read operations, by each compute node, on memory resources connected to the PCIe root complex of the other compute node over the NTB, using an atomicity algorithm used to guarantee atomicity of the atomic peer read operations to detect likely failure of the NTB, and using the detected likely failure of the NTB as a triggering event to cause the NTB monitoring process to wake up to test for the occurrence of the fatal error of the NTB.

In some embodiments, causing the NTB monitoring process to wake up causes a thread associated with the NTB monitoring process to be scheduled to operate on the CPU resources of the respective root complex as specified by the core affinity for the respective NTB monitoring process.

In some embodiments, using the atomicity algorithm to detect likely failure of the NTB includes reading a peer semaphore value on the peer compute node over the NTB. In some embodiments, the peer semaphore is configured to have one or more prohibited values, and the method further includes determining that the NTB has not failed in response to reading a value of the peer semaphore that is not one of the prohibited values. In some embodiments, in response to determining that the NTB has not failed, the method further includes enabling the NTB monitoring process to continue to sleep.

In some embodiments, the peer semaphore is configured to have one or more prohibited values, and detecting the likely failure of the NTB includes receiving one of the prohibited values in response to reading the value of the peer semaphore. In some embodiments, occurrence of a NTB error causes the NTB to return an error code to the atomicity algorithm selected from one of the prohibited values, in response to reading the peer semaphore by the atomicity algorithm.

In some embodiments, one of the triggering events is a failure to implement any atomic peer read operation for a threshold period of time.

In some embodiments, testing for the occurrence of the fatal error of the NTB includes implementing a local read of a local NTB monitoring address in local memory, and implementing a peer write operation to a peer NTB monitoring address in peer memory.

In some embodiments, a storage system, includes a first compute node, the first compute node having a first Peripheral Component Interconnect Express (PCIe) root complex, first CPU resources connected to the first PCIe root complex, and first memory resources connected to the first PCIe root complex, a second compute node, the second compute node having a second PCIe root complex, second CPU resources connected to the second PCIe root complex, and second memory resources connected to the second PCIe root complex, and a PCIe Non-Transparent Bridge (NTB) interconnecting the first PCIe root complex and the second PCIe root complex. The storage system further includes one or more first storage devices storing first instructions that are operable, when executed by first CPU resources, to cause the first CPU resources to perform operations including setting a core affinity for a first NTB monitoring process to require the first NTB monitoring process to execute on the first CPU resources connected to the first root complex, causing the first NTB monitoring process to sleep during normal operation until occurrence of a triggering event, and implementing first atomic peer read operations, by the first CPU resources, on the second memory resources connected to the second PCIe root complex over the NTB. The instructions are further operable to perform operations including using a first atomicity algorithm configured to guarantee atomicity of the first atomic peer read operations to detect likely failure of the NTB, and using the detected likely failure of the NTB as a triggering event to cause the first NTB monitoring process to wake up to test for the occurrence of the fatal error of the NTB.

In some embodiments, causing the first NTB monitoring process to wake up causes a first thread associated with the first NTB monitoring process to be scheduled to operate on the first CPU resources of the first root complex as specified by the core affinity for the first NTB monitoring process.

In some embodiments, using the first atomicity algorithm to detect likely failure of the NTB includes reading a first semaphore value on the second compute node over the NTB. In some embodiments, the first semaphore is configured to have one or more prohibited values, and the first instructions are further operable to determine that the NTB has not failed in response to reading a value of the first semaphore that is not one of the prohibited values. In some embodiments, the first instructions are further operable, in response to determining that the NTB has not failed, to cause the first NTB monitoring process to continue to sleep.

In some embodiments, the first semaphore is configured to have one or more prohibited values, and the first instructions are further operable to detect the likely failure of the NTB in response to receiving one of the prohibited values in response to reading the value of the first semaphore. In some embodiments, the NTB is configured, upon occurrence of a NTB error, to return an error code to the first atomicity algorithm selected from one of the prohibited values, in response to reading the first semaphore by the atomicity algorithm.

In some embodiments, one of the triggering events is a failure to implement any atomic read operation on the second memory resources for a threshold period of time.

In some embodiments, the first instructions are further operable to cause the first NTB monitoring process to test for the occurrence of the fatal error of the NTB by implementing a first read of a first NTB monitoring address in the first memory resources, and implementing a first write operation to a second NTB monitoring address in the second memory resources.

In some embodiments, the storage system further includes one or more second storage devices storing second instructions that are operable, when executed by second CPU resources, to cause the second CPU resources to perform operations including setting a core affinity for a second NTB monitoring process to require the second NTB monitoring process to execute on the second CPU resources connected to the second root complex, and causing the second NTB monitoring process to sleep during normal operation until occurrence of a second triggering event. The operations further include implementing second atomic peer read operations, by the second CPU resources, on the first memory resources connected to the first PCIe root complex over the NTB, using a second atomicity algorithm configured to guarantee atomicity of the second atomic read operations to detect likely failure of the NTB, and using the detected likely failure of the NTB as a triggering event to cause the second NTB monitoring process to wake up to test for the occurrence of the fatal error of the NTB.

BRIEF DESCRIPTION OF THE DRAWINGS

FIG. 8 is a swim lane diagram showing execution of the NTB monitoring process according to schedule or in response to IO inactivity, and showing operation where a PCIe Non-Transparent Bridge failure is not identified, according to some embodiments.

FIG. 9 is a swim lane diagram showing execution of the NTB monitoring process according to schedule or in response to IO inactivity, and showing operation where a PCIe Non-Transparent Bridge failure is identified, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
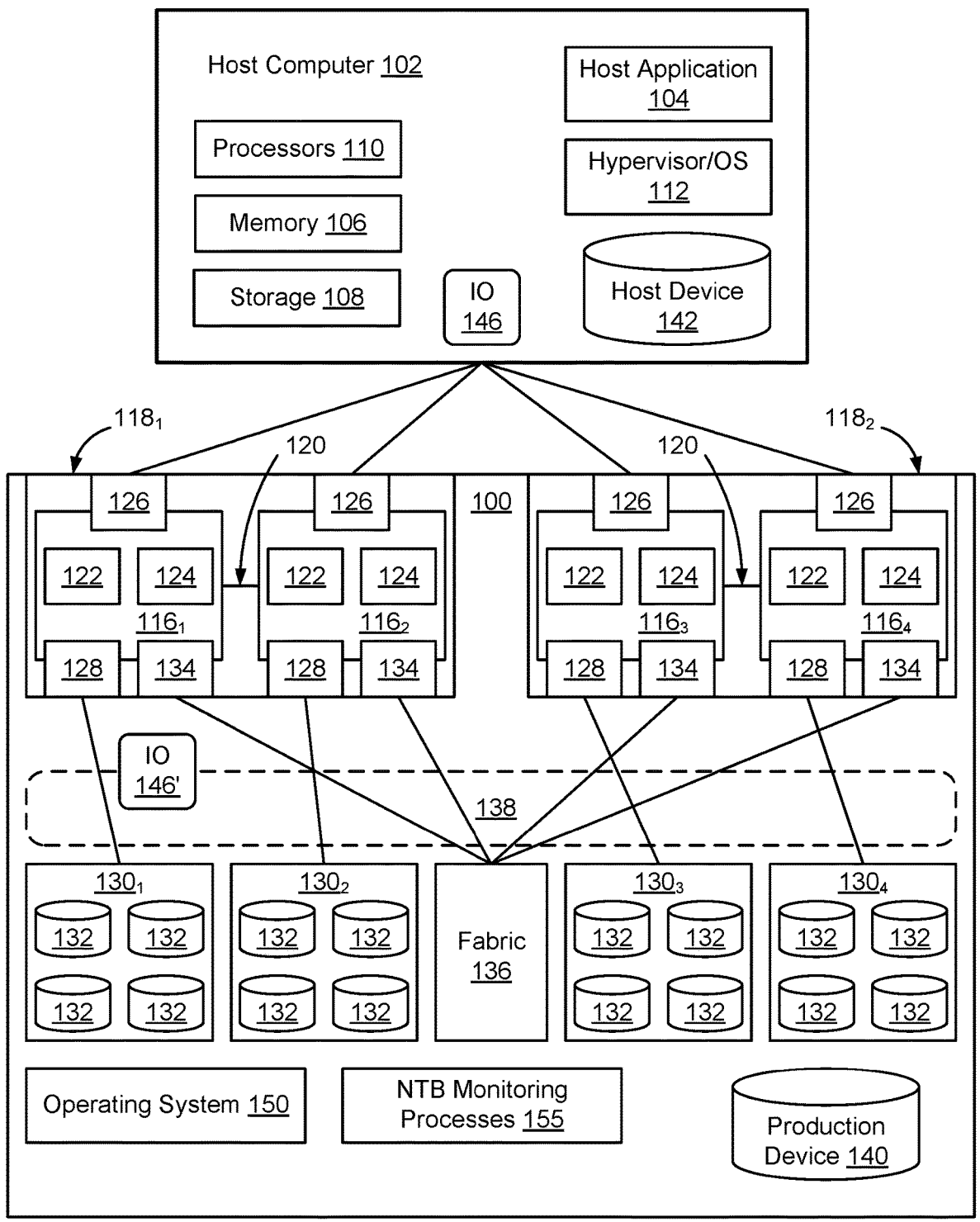
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g., ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe Non-Transparent Bridge (NTB). As used herein, the term "storage engine" will refer to a storage engine, such as storage engines $118_1$ and $118_2$, which has a pair of (two independent) compute nodes, e.g., ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe Non-Transparent Bridge (NTB) links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

Figure 2:
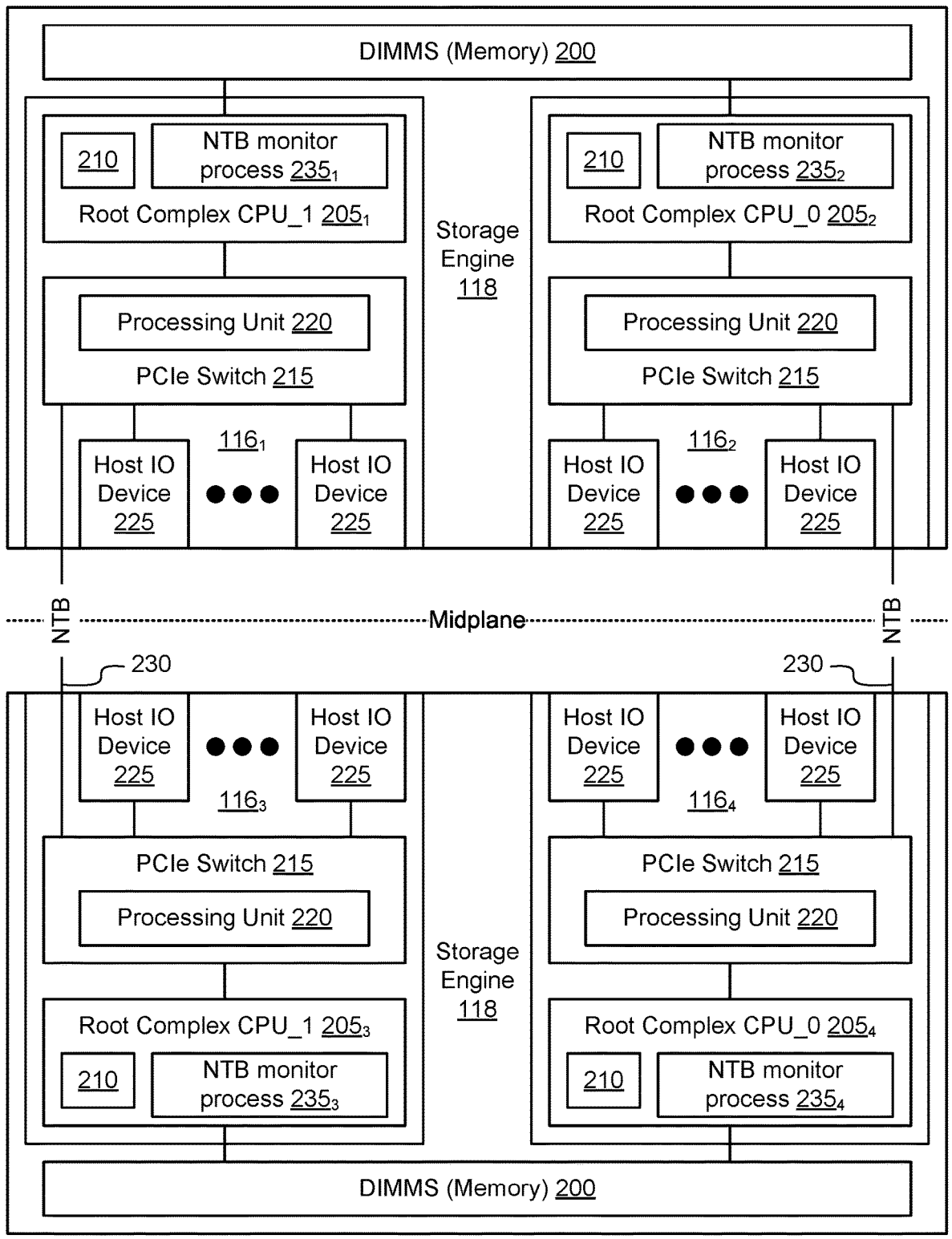
FIG. 2 is a functional block diagram of an example pair of storage engines having compute nodes with separate root complexes interconnected by a set of PCIe Non-Transparent Bridges, according to some embodiments.

FIG. 2 is a functional block diagram of an example storage system 100 having two storage engines 118, each storage engine 118 having a pair of compute nodes 116 with separate PCIe root complexes 205 (root complex 0 and root complex 1), interconnected with a set of one or more PCIe non-transparent bridges 230, according to some embodiments. A compute node 116 may be implemented as a blade in a storage system 100. A "blade", as that term is used herein, is a compact, self-contained server that includes core processing components and memory, that has a modular design and is configured to fit into an enclosure with other blades in a larger storage system.

As shown in FIG. 2, in some embodiments the storage system 100 has multiple storage engines 118 that are implemented as physically separate boards within the storage system 100, with separate power subsystems. The storage engines 118 may be connected to the storage system 100 at a hardware midplane. In some embodiments, the compute nodes 116 of each storage engine 118 are connected using Non-Transparent Bridges (NTBs) 230. A given NTB may have multiple NTB links. Additionally, multiple NTBs 230 may be used to interconnect the compute nodes 116 of the storage engines 118 of a given storage system 100. Although FIG. 2 shows an example storage system having two storage engines 118 for ease of illustration, it should be understood that the storage system 100 may have multiple storage engines 118. Likewise, although FIG. 2 shows an example storage system 100 in which each storage engine 118 has two compute nodes 116, it should be understood that a given storage engine 118 may have more than two compute nodes 116 depending on the implementation.

As shown in FIG. 2, in some embodiments each compute node 116 includes a set of host IO devices 225. A Host IO device 225, in some embodiments, is an electrical component that is configured to be physically connected to physical communication links (wired or wireless) via a host IO interface, and contains electrical components configured to initially receive and process host read operations from hosts over a wired or wireless communication network. An example host IO device 225 may be implemented as Small I/O Card (SLIC) device that is designed to be a hot pluggable IO module that is able to be used with any IO technology, although other physical components may be utilized as well depending on the particular implementation.

Each host IO device 225 has a host IO device driver. The host IO device driver, in some embodiments, is specific to the IO device and IO technology. For example, in embodiments where the IO technology is Fibre Channel, the host IO device 225 will include a host IO device driver implemented as a Fibre Channel driver that manages host IO operations on the host IO device 225 and controls operation of the host IO device 225. When other IO technologies are used, the host IO device driver will be implemented to interoperate using the intended IO technology. In some embodiments, the host IO devices 225 are electrical components that are physically connected to physical communication links such as Ethernet wires, fiber optic cables, or wireless communication mediums, and are configured to be components that initially receive and process host read and write operations from hosts over a wired or wireless communication network.

The host IO devices 225 receive host IO read and write operations from hosts 102, and hardware and firmware of the host IO devices 225 manage the host IO read and write operations on local memory 200 and peer memory 200. As used herein, the term "local" is used to refer to the compute node 116 connected to the host IO device 225 where the IO operation is received from the host. The term "peer" is used to refer to the compute node that is connected to the local compute node by the NTB 230.

For host read operations, the host IO device 225 uses an API to obtain the physical address of the requested data, and implements a direct read of the requested data either from local memory or from peer memory over the NTB 230, to obtain the requested data and respond to the host read operation. For host write operations, the host IO device 225 translates the destination address of the host write operation to a dual-cast region of the PCIe switch 215 and sends the write operation to the PCIe switch 215. Additional details associated with implementing host write operations are contained in U.S. Pat. No. 11,537,313, the content of which is hereby incorporated herein by reference.

As shown in FIG. 2, in some embodiments each compute node 116 of a given storage engine 118 has a separate PCIe root complex 205. The host IO devices 225 can connect directly to the PCIe root complex 205 or, optionally, a PCIe switch 215 interconnects host IO devices 225 with the root complex 205. Each compute node 116 also includes memory 200 that is also connected to the root complex 205. In some embodiments, the root complex is a device that connects the CPU 210 and memory 200 subsystem to the PCI Express (PCIe) switch fabric 215, which is composed of one or more PCIe or PCI devices. The root complex 205 may be a separate physical component from the CPU 210, or the functionality of the root complex 205 may be integrated into the chipset/CPU 210, depending on the implementation.

As shown in FIG. 2, the PCIe root complexes 205 on separate compute nodes of a storage engine 118 are interconnected using a Non-Transparent Bridge (NTB) 230. For example, in FIG. 2 root complex $205_1$ on compute node $116_1$ is connected by a first NTB 230 to root complex $205_3$ on compute node $116_3$. Likewise, root complex $205_2$ on compute node $116_2$ is connected by a second NTB 230 to root complex $205_4$ on compute node $116_4$. Each Non-Transparent Bridge (NTB) 230 is a PCIe intra-node bridge that enables data transport between compute nodes implemented using different root complexes 205. In some embodiments, the NTB 230 is the data transport used by software to obtain locks on the peer memory 200 in connection with direct read operations on the peer memory 200. The CPU root complex 205 can implement the functionality of the NTB 230 or, optionally, the NTB 230 can be implemented by PCIe switch 215. Accordingly, although FIG. 2 shows NTBs 230 extending between the PCIe switches 215 of the compute nodes 116, it should be understood that the NTBs 230 can also extend directly between the CPU root complexes 205, depending on the particular implementation.

In some embodiments, the firmware of the PCIe switch 215 on the local compute node 116 is programmed during enumeration to recognize the peer memory 200 as connected to the PCIe switch 215 on the NTB 230. Any PCIe Transaction Layer Packet (TLP) addressed to an address on peer memory 200 is passed by the PCIe switch 215 over the NTB 230 to enable the host IO device 225 to implement direct read operations on the peer memory 200 of the peer compute node 116. Accordingly, in some embodiments the host IO device 225 is able to directly address read operations to peer memory 200 using the same process that the host IO device 225 uses to directly address read operations to local memory 200. All read operations on peer memory 200 are transmitted by the PCIe switch 215/root complex 205 on the local compute node 116 over the NTB 230 and routed by the PCIe switch 215/root complex 205 on the peer compute node 116 to attached peer memory 200.

If an error occurs on PCIe NTB 230, one of the compute nodes 116 should be indicted to prevent the error from spreading within the storage engine 118, and perhaps causing a loss of data. Specifically, when a fatal fault on all the NTB 230 interconnecting a pair of compute nodes 116 occurs, one of the compute nodes 116 must be fenced off from the memory subsystem (including, especially, from the customer data).

In some instances, processing characteristics of the PCIe bridge 215 and the root complex 205 can cause software to stall, which can cause the software to incorrectly timeout and report a hardware failure. While it is possible for the PCIe bridge 215 to ride out these stalls by increasing the credit timeout interval in their configuration settings, this solution only works in situations where there isn't an actual hardware fault. However, when a hardware error occurs, long credit timeouts cause delays in the software's initiation of recovery code. These delays may lead to data corruption and situations where data is unavailable or lost, which is undesirable. On the other hand, the PCIe bridge 215 devices cannot shorten the credit timeout too low . . . otherwise, devices will drop (fatal error) every time the PCIe bus sees a spike in traffic. The goal, and the challenge, is to determine that there is a problem with an NTB link before the link itself asserts a completion timeout or other fatal error interrupt.

More specifically, in some embodiments a specific problem occurs when a DIMM (Dual In-Line Memory Module) fault (or a CPU Clock fault) is present on a storage engine 118 with multiple CPU root complexes. DIMM faults are a common occurrence in the field and the expectation is for the storage engine/blade to reset—but the reset can take a long time to manifest. Looking closer, when a memory 200 (DIMM) is faulted, the root complex 205 that the DIMM is connected to will seize and stop processing instructions. But the PCIe switches 215 have their own processing units 220 that continue to operate. This means that the NTB links 230 continue to appear alive for hundreds of milliseconds after the fault. Hundreds of milliseconds is an extremely long time, when considering that atomic read and write operations may be implemented on the order of 5 microseconds. Accordingly, thousands if not tens of thousands of IO operations may occur between the time that the DIMM failed and the time that the NTB link 230 is failed.

According to some embodiments, a NTB monitoring process is used to monitor the peer node for occurrence of an error, to enable the NTB link to be failed more quickly in the event of an error on the peer compute node. As noted above, when a DIMM 200 failure occurs, the CPU root complex 205 to which it is attached will stop processing instructions. It is possible for a NTB monitoring process on the local compute node to detect this change at the peer compute node, and shut down the NTB link 230. However, running a NTB monitoring process consumes CPU resources that otherwise could be used to process host IO operations. The problem thus becomes configuring the NTB monitoring process to guarantee that the monitoring threads are scheduled to run frequently enough to catch errors but not so frequently, that the threads disrupt performance. If the number of NTB monitoring threads are multiplied and their scheduling counts are increased, the probability of early error detection is maximized. But doing so comes at a cost. NTB monitoring threads can thrash and get in the way of the worker threads that are actively handling customer workloads, and thus the monitoring can negatively impact overall system performance.

According to some embodiments, each NTB monitor thread implements heartbeats between the compute nodes to indicate the link is healthy. Multiple monitor threads are used. But if threads are allowed to float between CPU root complexes, they can all be scheduled on the same root complex. And in the case of a DIMM fault, which will seize one root complex, all the threads can continue to run, or all the threads can degrade to a halt. In the former case, the peer sees the heartbeats as alive and well and recovery is further delayed. According to some embodiments, a respective NTB monitor process 235 is assigned to execute on CPU resources of each CPU root complex. This may be achieved, for example, by setting the processor affinity of each respective NTB monitor process 235 to require the respective NTB monitor process 235 to execute on a respective CPU 210 of the CPU root complex. Having dedicated monitor threads, one per CPU root complex, is necessary for the peer to detect dead heartbeats. Stated differently, the dedicated monitor threads must not be allowed to float among the CPU root complexes. Only this solution will (1) prevent immediate use of the NTB link, (2) prevent congestion of the NTB link on the healthy blade resulting in dual internal errors (both blades reset), and (3) prevent catastrophic failure, because data is mirrored within an engine.

To remediate the second problem of consuming operating system resources to ensure early error detection, according to some embodiments the NTB monitor thread is configured to leverage error detection in user workflows. Rather than having the NTB monitor thread scheduled to execute frequently, in some embodiments any read of the peer memory is leveraged as a test of the health of the underlying flow that services the read request. Since multiple APIs may be involved with implementing the actual read requests, in some embodiments software atomicity algorithms used to implement all read requests are used to monitor the health of the NTB rather than the read operations themselves. By targeting the software algorithm used to provide atomicity between the memory domains of the two compute nodes 116, it is possible to monitor the health of the NTB for all read IOs, regardless of the API that was used to generate the read IO. In some embodiments, the software atomicity algorithm is selected as the NTB monitoring candidate because (1) the software atomicity algorithm uses the NTB hardware to service its reads; (2) the software atomicity algorithm is used very frequently as part of user workloads; and (3) the software atomicity algorithm is able to be configured to specify that particular prohibited values, such that a read of 0xFFFFFFFF, are never valid semaphore values. By configuring the NTB to return a prohibited semaphore value upon occurrence of an NTB error, the software atomicity algorithm can identify the difference between a successful semaphore acquisition and a NTB failure, which is very valuable since it leaves no room for a false negative.

Atomicity algorithms vary and are already well documented. Examples abound on how to achieve mutual exclusion of a resource among multiple threads. When trying to achieve mutual exclusion of a resource shared between two memory domains (between two compute nodes), the software atomicity algorithms use the NTB link to access semaphore variables that reside on the peer host memory. By acquiring a local semaphore as well as a semaphore on the peer compute node, atomicity is guaranteed between the two compute nodes.

According to some embodiments, configuring the NTB links to return an error value that the semaphore is prohibited from returning, such −1 or 0xFFFFFFFF, and by prohibiting the value of the semaphore from ever returning −1 or 0xFFFFFFFF, the read of the semaphore on the peer compute node can be leveraged as a test of the health of the NTB link. If a read of the peer semaphore returns −1, 0xFFFFFFFF, or another prohibited value, a signal is fired and the NTB monitor thread is woken up to handle the error. By checking the NTB link using software atomicity algorithms (which run on almost every IO operation), the NTB monitor threads 235 do not need to be replicated and they do not need to run very often. Rather, the NTB monitor threads 235 can sit and wait for a worker thread to wake them up and, once wakened, can check the health of the peer compute node and fail the NTB link in dependence on the determined health of the peer compute node.

Figure 3:
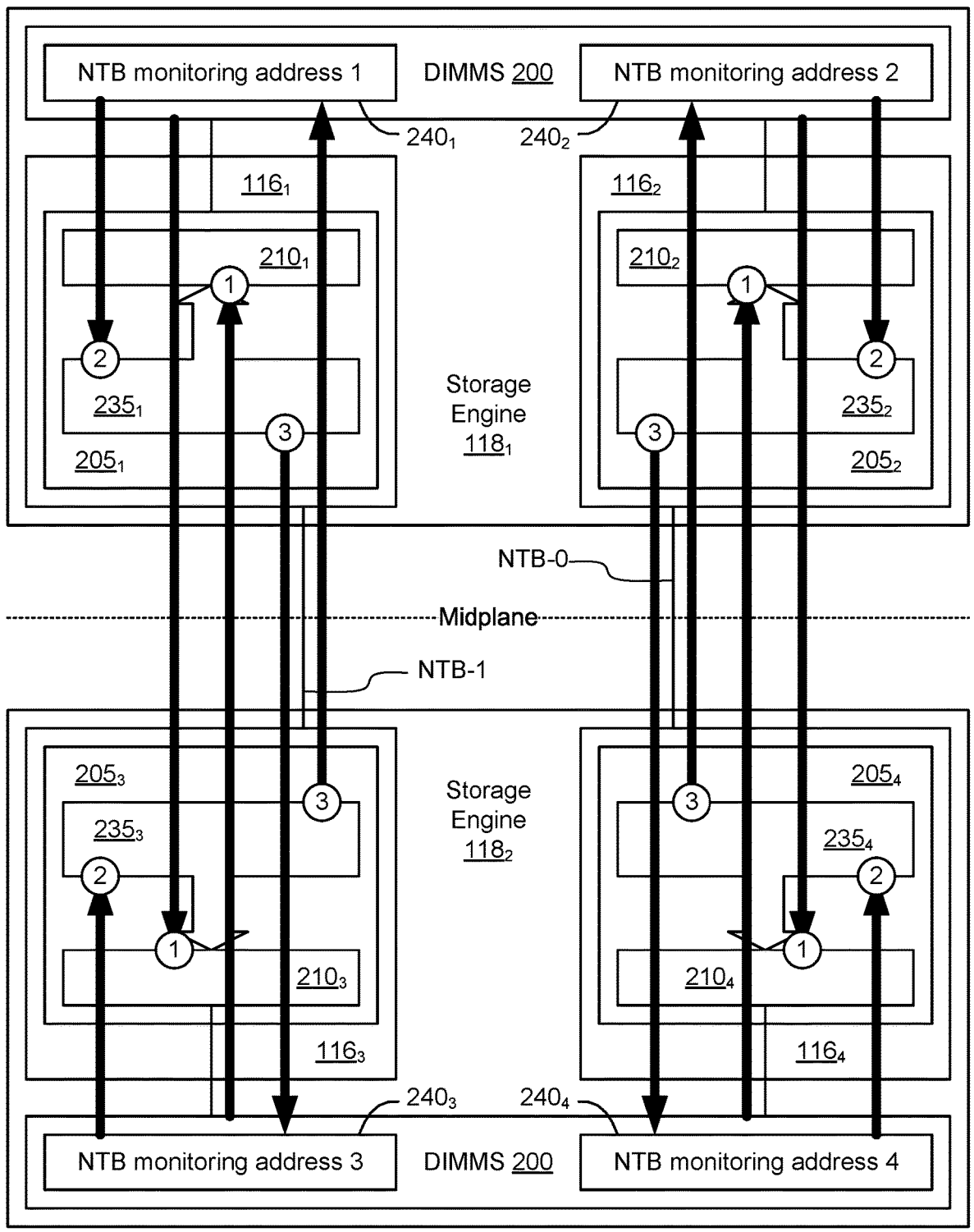
FIG. 3 is a functional block diagram an example pair of storage engines having compute nodes with separate root complexes interconnected by a set of PCIe Non-Transparent Bridges, and showing NTB monitoring processes having CPU affinity set to cause respective NTB monitoring process instances to execute on CPU resources of each respective CPU root complex, according to some embodiments.

FIG. 3 is a functional block diagram an example pair of storage engines having compute nodes with separate root complexes interconnected by a set of PCIe Non-Transparent Bridges (NTBs), and showing NTB monitoring processes having CPU affinity set to cause respective NTB monitoring process instances to execute on CPU resources of each respective CPU root complex, according to some embodiments. As shown in FIG. 3, in the illustrated example storage engine $118_1$ has two compute nodes $116_1$ and $116_2$. Storage engine $118_2$ also has two compute nodes $116_3$ and $116_4$. Each compute node $116_1$, $116_2$, $116_3$, and $116_4$ has a respective CPU root complex $205_1$, $205_2$, $205_3$, $205_4$. A respective NTB monitoring process $235_1$, $235_2$, $235_3$, $235_4$ is configured to execute on a respective CPU $210_1$, $210_2$, $210_3$, $210_4$ on each CPU root complex.

In connection with implementing read operations on peer memory (arrow 1), a software atomicity algorithm on the local compute node is used to obtain a semaphore on the peer compute node. Specifically, the software atomicity algorithm will read a value of the semaphore on the peer node over the NTB. If the software atomicity algorithm tries to read the value of the semaphore over the NTB, and the peer node has failed, the NTB will respond to the software atomicity algorithm with one of the semaphore prohibited values. For example, the semaphore may be prohibited from returning −1 or 0xFFFFFFFF, or another particular value. By causing the NTB to return as an error code one of the semaphore prohibited values when a transaction on the NTB fails, such as 0xFFFFFFFF, the software atomicity algorithm can detect a possible failure of the NTB and, wake up the NTB monitor thread in response to detecting the possible error on the NTB.

Once awake, the NTB monitoring process thread executes on the CPU of that compute node to determine the health of the peer compute node that is connected to the compute node over the NTB. In some embodiments, the NTB monitoring process implements a read operation on a local NTB monitoring address (arrow 2), and implements a write operation on a peer NTB monitoring address (arrow 3). If either operation fails, the NTB monitoring process reports a failure of the NTB 230. For example, in some embodiments the peer NTB monitoring process will periodically write to the local NTB monitoring address. Accordingly, if the read operation by the local NTB monitoring process on the local NTB monitoring address (arrow 2) returns an incorrect value, the local NTB monitoring process can infer a failure by the peer NTB monitoring process and shut down the NTB link. Similarly, if the local NTB monitoring process attempts to write to the peer NTB monitoring address (arrow 3), and the write is not successful, the NTB monitoring process can determine that the peer has experienced a failure and can shut down the NTB link.

Figure 4:
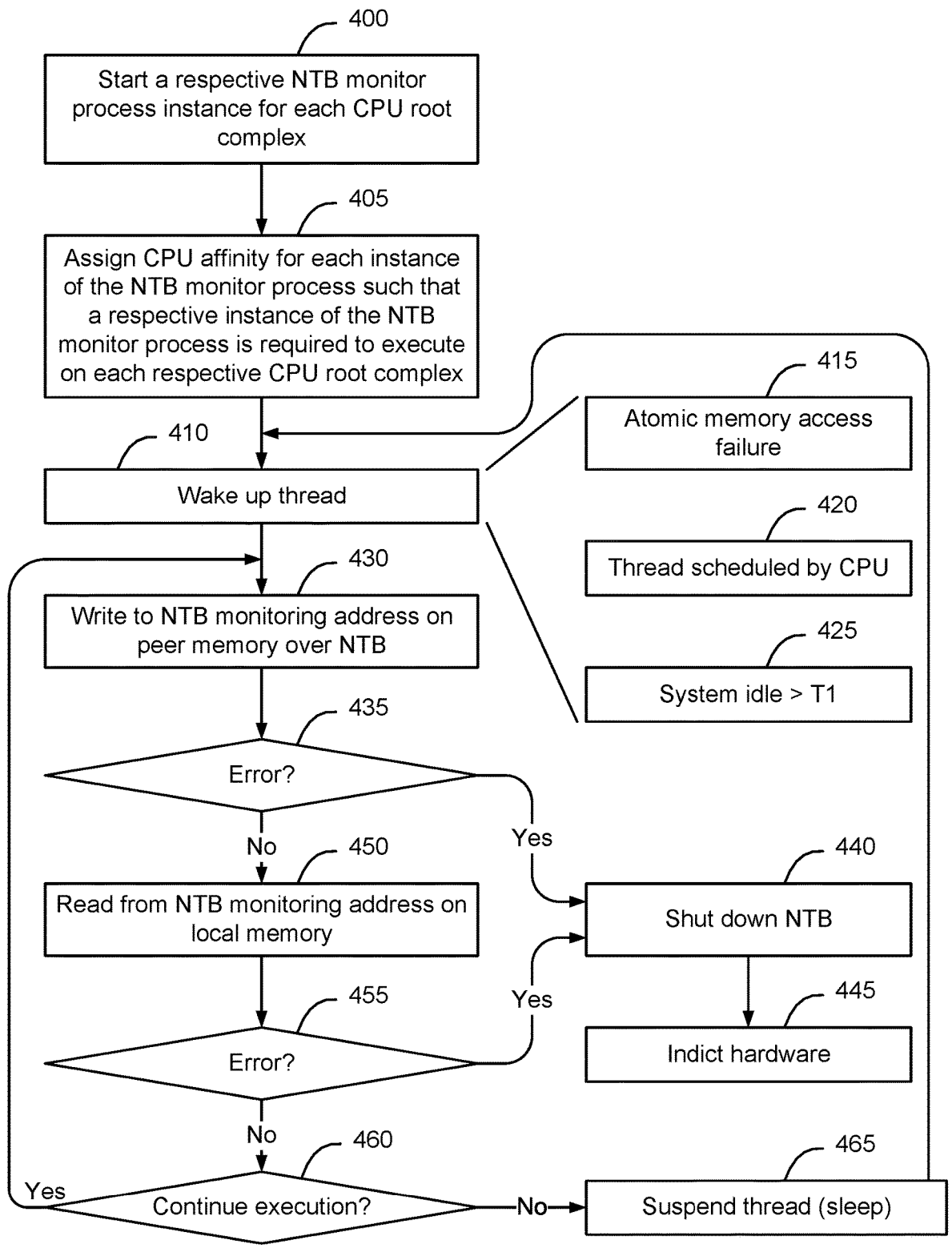
FIG. 4 is a flow chart of a method of monitoring a set of PCIe NTBs, according to some embodiments.

FIG. 4 is a flow chart of a method of monitoring a set of PCIe NTBs, according to some embodiments. As shown in FIG. 4, in some embodiments a respective NTB monitor process instance is started for each CPU root complex (block 400). The CPU affinity for each instance of the NTB monitor process is assigned such that a respective instance of the NTB monitor process is required to execute on a CPU on each respective CPU root complex (block 405). A given CPU root complex may have multiple CPUs, and each CPU may have multiple CPU cores. Depending on the implementation, the CPU affinity may assign the respective NTB monitor process for the CPU root complex to a particular CPU core, to a particular set of CPU cores, to a particular CPU, or to the set of CPUs connected to or forming part of the CPU root complex. By causing a respective instance of the NTB monitor process to execute on CPU resources of each respective root complex, it is possible to ensure that the NTB links connected to the respective root complex are monitored by the respective NTB monitor process.

Processor affinity or CPU pinning enables applications to bind or unbind a process or a thread to a specific core or to a range of cores or CPUs. The operating system ensures that a given thread executes only on the assigned core(s) or CPU(s) each time it is scheduled, if it was pinned to a core.

Operating systems support CPU affinity through APIs. Since different operating systems have different APIs, different instructions might be required to set the core affinity for each of the NTB monitor processes. Accordingly, the particular manner in which the CPU affinity for a task, such as the NTB monitor process, is set may depend on the operating system that is being used to schedule tasks for execution on the CPU. For example, in Linux the $taskset tool can be used to assign core affinity of a process. For example, the instruction $taskset-p<coremask> <PID> can be used to assign a process having the Process Identification (PID) to execute on a set of cores identified in the coremask. Similarly, the instruction $taskset-cp<core-list> <PID> can be used to assign the process to execute on a particular core or set of cores in the core list. Other instructions may be used to set core affinities for each of the instances of the NTB monitor process, to force each NTB monitor process to execute on a core or set of cores of a particular CPU connected to a particular root complex, to ensure that the NTB monitor process are distributed across the set of root complexes to monitor all of the NTB links that are connected to all of the root complexes in the storage engine.

The NTB monitor process normally is not active to prevent the NTB monitor process from consuming CPU resources that otherwise can be used to implement other tasks, such as processing host IO operations on the storage engine. Periodically, as shown in FIG. 4, the thread implementing the NTB monitor process will wake up and execute on the assigned CPU (block 410). Example trigger events that might cause the thread to wake up include an atomic memory access failure on the peer node (block 415), if the thread implementing the NTB monitor process reaches a scheduled wakeup point (block 420), and if the IO operations on the system have been idle for a particular threshold amount of time (block 425). Other trigger events might cause the thread to wake up as well, depending on the particular implementation.

In some embodiments, the NTB monitor process leverages the software atomicity algorithms, which use the NTB link to access semaphore variables that reside on the peer host memory, to monitor the health of the NTB link. If the software atomicity algorithm returns a failure (block 415), the failure causes the NTB monitor process to wake up to determine the health of the NTB link. Not every attempt to access a semaphore on the peer host memory will identify a fatal NTB link error. However, by contrast, a successful attempt to access the semaphore on the peer host memory, which requires the use of the NTB link, indicates that the NTB link is not in a failed state. Accordingly, by leveraging the software atomicity algorithm's use of the NTB link in connection with implementing read operations on peer memory, it is possible to monitor the health of the NTB link while maintaining the NTB monitor process in a sleep state.

In some embodiments, if the system has been idle longer than a particular threshold period of time (block 425), the software atomicity algorithm will not have used the NTB link to access the semaphore variables that reside on the peer host memory for a threshold period of time. According to some embodiments, if the system has been idle for a period of time (block 425), the NTB monitor process is scheduled to execute on the assigned CPU (block 410), to determine the health of the NTB link. An example threshold period of time may be on the order of several seconds to 30 seconds, depending on the particular implementation.

When the NTB monitor process wakes up (block 410) the NTB monitor process implements a write operation to the NTB monitoring address 240 on peer memory over the NTB (block 430). The NTB monitor process then determines if the write operation resulted in an error (block 435). In response to a determination that an error occurred and the NTB monitor process was not able to write to the NTB monitoring address on peer memory over the NTB (a determination of YES at block 435), the NTB monitoring process shuts down the NTB (block 440). In response to a determination that an error did not occur and the NTB monitor process was able to write to the NTB monitoring address on peer memory over the NTB (a determination of NO at block 435), the NTB monitoring process does not shut down the NTB link based on the result of the write operation.

When the NTB monitor process wakes up (block 410) the NTB monitor process also implements a read operation on the NTB monitoring address on local memory (block 450). The NTB monitor process then determines if the read operation resulted in an error (block 455). In response to a determination that an error occurred, for example the read operation returned a value indicating that the peer NTB monitoring process was not able to write to the NTB monitoring address in local memory (a determination of YES at block 455), the NTB monitoring process shuts down the NTB (block 440). In response to a determination that an error did not occur and the NTB monitor process was able to read the correct value from the NTB monitoring address on local memory (a determination of NO at block 455), the NTB monitoring process does not shut down the NTB link based on the result of the read operation.

Although FIG. 4 shows the write operation (block 430) happening first and then the read operation (block 450) happening subsequently, it should be understood that the order of these operations may be reversed depending on the implementation. The crux is that, when the NTB monitoring process wakes up, the NTB monitoring process implements both a local read operation and a peer write operation. The local read operation tests the peer NTB monitoring process's use of the NTB link, while the peer write operation tests the local NTB monitoring process's use of the NTB link. If either test fails, the NTB link is shut down (block 445). Optionally, when the NTB link is shut down, the storage engine 118 implements a hardware indictment process (block 445) to determine which side of the NTB link has experienced failure and needs to be repaired/replaced.

In some embodiments, as shown in FIG. 4, after performing both the read operation (blocks 450, 455) and the write operation (blocks 430, 435), a determination is made as to whether the NTB monitoring process should continue execution (block 460). If the NTB monitoring process should continue execution (a determination of YES at block 460), the process returns to block 430 and the NTB monitoring process code periodically implements read operations (blocks 450, 455) and write operations (blocks 430, 435) to monitor the state of the NTB. If the NTB monitoring process should not continue execution (a determination of NO at block 460), the thread implementing the NTB monitoring process is suspended to cause the thread to sleep (block 465).

Figure 5:
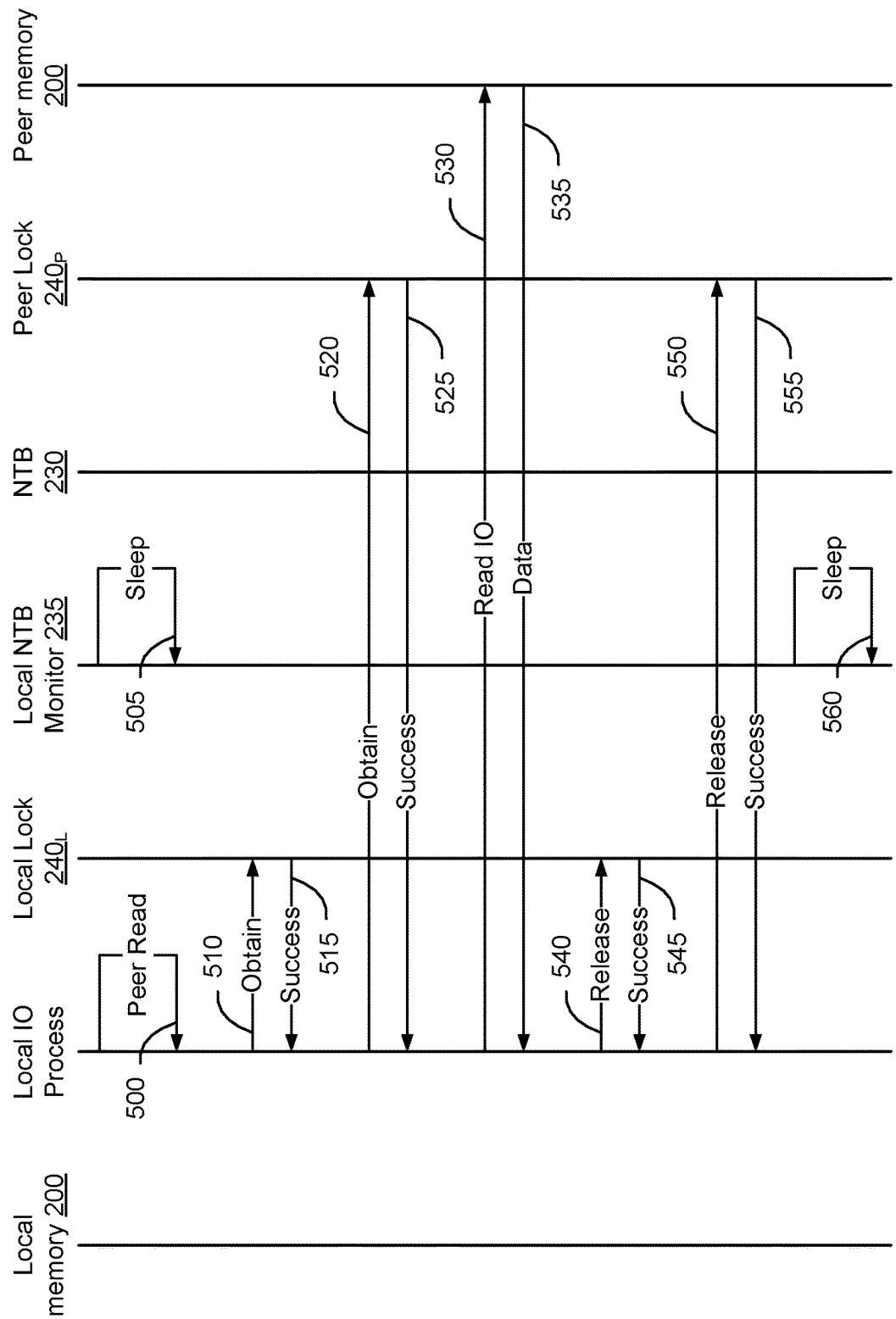
FIG. 5 is a swim lane diagram showing execution of a read operation by a local IO process on peer memory, according to some embodiments.

FIG. 5 is a swim lane diagram showing execution of a read operation by a local IO process on peer memory, according to some embodiments. As shown in FIG. 5, during a read operation by a local IO process (arrow 500) a software atomicity algorithm will request both a local lock $240_L$ (arrow 510) and a peer lock $240_P$ (arrow 520). The locks prevent other operations from being implemented on the particular memory address, thus ensuring atomicity of the operation. As used herein, the term "atomic operation" is used to refer to an operation that will always be executed without any other process being able to read or change state that is read or changed during the operation. The local lock and peer lock can be implemented using semaphores, mutexes, or other constructs depending on the implementation. By acquiring a local lock (arrow 515) as well as a lock on the peer compute node (arrow 525), atomicity is guaranteed between the two compute nodes. In some embodiments, the process of obtaining the local lock (arrows 510, 515) is implemented by causing the software atomicity algorithm to read the value of a local semaphore, and the process of obtaining the peer lock (arrow 520, 525) is implemented by causing the software atomicity algorithm to read the value of a peer semaphore over the NTB.

Once the software atomicity algorithm has obtained the required locks, the read operation is implemented on peer memory (arrow 530) and the data is returned to the local IO process (arrow 535). The software atomicity algorithm then releases the local lock $240_L$ (arrows 540 and 545) and the lock on the peer compute node $240_P$ (arrows 550 and 555).

Although FIG. 5 shows the software atomicity algorithm as obtaining the local lock first (arrows 510, 515) and then obtaining the peer lock (arrows 520, 525), it should be understood that the locks may be obtained in the reverse order or simultaneously requested, depending on the particular implementation. Likewise, the order in which the local lock is released (arrows 540, 545) and the peer lock is released (arrows 550, 555) may be reversed or implemented simultaneously, depending on the implementation.

As shown in FIG. 5, during normal peer read operations, the software atomicity algorithm is required to use the NTB 230 to obtain the peer lock $240_P$. Accordingly, when the software atomicity algorithm successfully obtains the peer lock $240_P$, the local NTB monitor 235 is allowed to sleep (arrows 505, 560) and is not required to wake up to check the status of the NTB. Specifically, by leveraging the software atomicity algorithm's successful use of the NTB to obtain the peer lock in connection with a peer read operation (arrow 500), it is possible for the local NTB monitor process 235 to verify the health of the NTB without being scheduled to execute on the CPU resources of the root complex.

Figure 6:
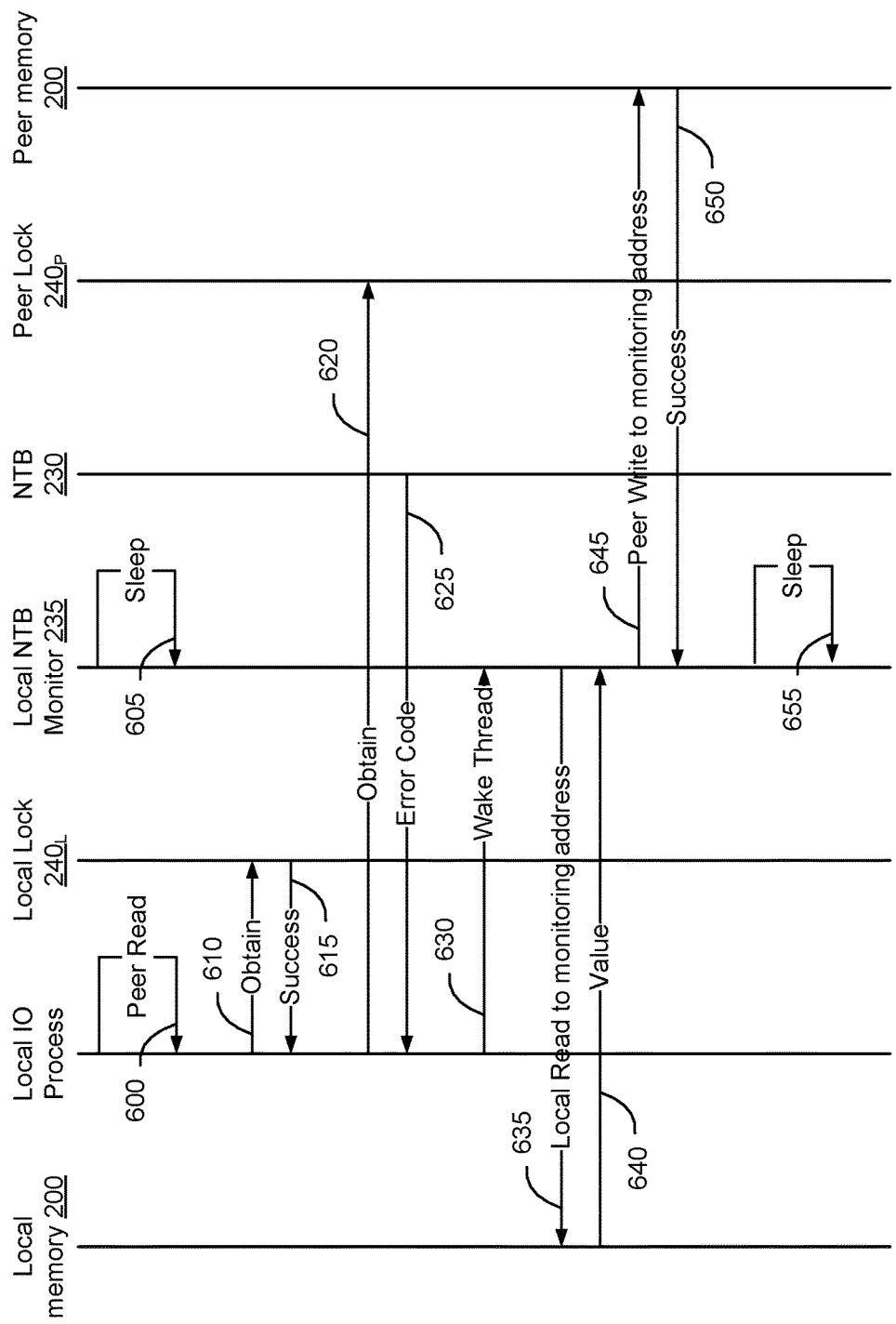
FIG. 6 is a swim lane diagram showing execution of the NTB monitoring process in connection with a failure of the local IO process to obtain a peer lock, and showing operation where a PCIe Non-Transparent Bridge failure is not identified, according to some embodiments.

FIG. 6 is a swim lane diagram showing execution of the NTB monitoring process in connection with a failure of the local IO process to obtain a peer lock, and showing operation where a PCIe Non-Transparent Bridge failure is not identified, according to some embodiments. As shown in FIG. 6, initially the local NTB monitor process 235 is sleeping (arrow 605) when a read operation on peer node is started by a local IO process (arrow 600). To implement the read operation on peer memory 200, the software atomicity algorithm attempts to obtain both a local lock (arrows 610, 615) and a lock on the peer compute node (arrow 620). However, rather than being successful in obtaining the peer lock, the NTB link returns a value that is identifiable by the software atomicity algorithm as an error (arrow 625), rather than the value of the semaphore (peer lock). For example, in some embodiments the value of the semaphore is configured to never have a value of 0xFFFFFFFF, and the NTB link is configured to return a value of 0xFFFFFFFF whenever there is an error on the NTB link. By setting these configuration parameters, it is possible to use the read of the semaphore on the peer node to enable the software atomicity algorithm to identify occurrence of an error on the NTB link (arrow 625). Specifically, the software atomicity algorithm will try to read the value of the peer semaphore, and in response, the NTB will return an error code that is a value that the semaphore is prohibited from returning. As such, the software atomicity algorithm will determine that the semaphore returned an incorrect value, which is an event that causes the software atomicity algorithm to wake up the NTB monitor process.

When the software atomicity algorithm reads the value of the semaphore on the peer, and receives a value that is identifiable by the software atomicity algorithm as an error code, the software atomicity algorithm causes the local NTB monitor process to wake (arrow 630). When the local NTB wakes up, the local NTB monitor process performs both a local read to a local NTB monitoring address (arrows 635, 640) and a peer write to a peer NTB monitoring address (arrows 645, 650). If both the local read and the peer write are successful (arrows 640, 650), the NTB is operational, and execution of the local NTB monitor process can go back to sleep (arrow 655).

Figure 7:
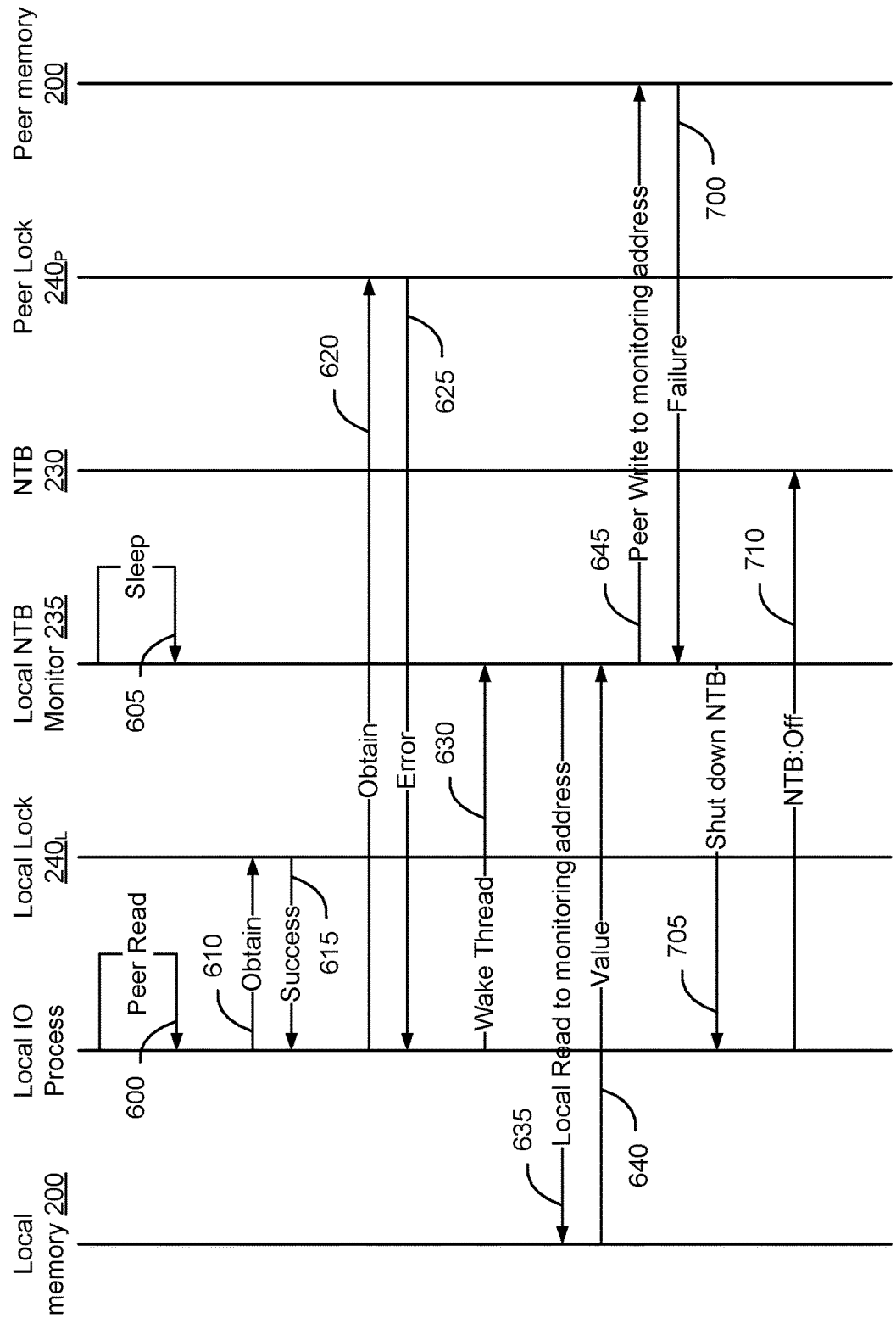
FIG. 7 is a swim lane diagram showing execution of the NTB monitoring process in connection with a failure of the local IO process to obtain a peer lock and showing operation where a PCIe Non-Transparent Bridge failure is identified, according to some embodiments.

FIG. 7 is a swim lane diagram showing execution of the NTB monitoring process in connection with a failure of the local IO process to obtain a peer lock and showing operation where a PCIe Non-Transparent Bridge failure is identified, according to some embodiments. FIG. 7 is similar to FIG. 6, except that in response to the peer write to the monitoring address (arrow 645), the local NTB monitor process 235 determines that there has been a failure of the NTB (arrow 700). In response to the determination of the failure of the NTB, the local NTB monitor process 235 instructs the local IO process to shut down the NTB (arrow 705), which causes the NTB to be turned off (arrow 710). The particular manner in which the NTB is deactivated (arrows 705, 710) will depend on the particular implementation.

FIG. 8 is a swim lane diagram showing execution of the NTB monitoring process according to schedule or in response to IO inactivity, and showing operation where a PCIe Non-Transparent Bridge failure is not identified, according to some embodiments. As shown in FIG. 8, in some embodiments the local NTB monitor process 235 is configured to normally sleep (arrow 800) and wake up in connection with particular events, such as when scheduled by the operating system (arrow 805) or if the software atomicity algorithm has not been invoked within a particular period of time (arrow 810). In response to one of these trigger events, the thread implementing the local NTB monitor will wake up (arrow 815). When the local NTB wakes up, the local NTB monitor process performs both a local read to a local NTB monitoring address (arrows 820, 825) and a peer write to a peer NTB monitoring address (arrows 830, 835). If both the local read and the peer write are successful (arrows 825, 835), the NTB is operational, and execution of the local NTB monitor process can go back to sleep (arrow 840).

FIG. 9 is a swim lane diagram showing execution of the NTB monitoring process according to schedule or in response to IO inactivity, and showing operation where a PCIe Non-Transparent Bridge failure is identified, according to some embodiments. FIG. 9 is similar to FIG. 8, except that that response to the peer write to the monitoring address (arrow 830) the local NTB monitor process 235 determines that there has been a failure of the NTB (arrow 900). For example, the NTB may respond to the peer write with an error code, e.g., 0xFFFFFFFF, indicating that the peer memory is not available. In response to the determination of the failure of the NTB (arrow 900), the local NTB monitor process 235 instructs the local IO process to shut down the NTB (arrow 905), which causes the NTB to be turned off (arrow 910). The particular manner in which the NTB is deactivated will depend on the particular implementation.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of monitoring for occurrence of a fatal error on a Peripheral Component Interconnect Express (PCIe) Non-Transparent Bridge (NTB) interconnecting two respective PCIe root complexes of two respective compute nodes, comprising:
    implementing a respective NTB monitoring process on each respective compute node;
    setting a core affinity for each respective NTB monitoring process to require the respective NTB monitoring process to execute on CPU resources on the respective root complex;
    causing the NTB monitoring process to sleep during normal operation until occurrence of a triggering event;
    implementing atomic peer read operations, by each compute node, on memory resources connected to the PCIe root complex of the other compute node over the NTB;
    using an atomicity algorithm used to guarantee atomicity of the atomic peer read operations to detect possible failure of the NTB; and
    using the detected possible failure of the NTB as the triggering event to cause the NTB monitoring process to wake up to test for the occurrence of the fatal error of the NTB;
    wherein using the atomicity algorithm to detect possible failure of the NTB comprises reading a peer semaphore value on the peer compute node over the NTB; and
    wherein the peer semaphore is configured to have one or more prohibited values, the method further comprising determining that the NTB has not failed in response to reading a value of the peer semaphore that is not one of the prohibited values.

2. The method of claim 1, wherein causing the NTB monitoring process to wake up causes a thread associated with the NTB monitoring process to be scheduled to operate on the CPU resources of the respective root complex as specified by the core affinity for the respective NTB monitoring process.

3. The method of claim 1, in response to determining that the NTB has not failed, enabling the NTB monitoring process to continue to sleep.

4. The method of claim 1, wherein detecting the possible failure of the NTB comprises receiving one of the prohibited values in response to reading the value of the peer semaphore.

5. The method of claim 4, wherein occurrence of a NTB error causes the NTB to return an error code to the atomicity algorithm selected from one of the prohibited values, in response to reading the peer semaphore by the atomicity algorithm.

6. The method of claim 1, wherein one of the triggering events is a failure to implement any atomic peer read operation for a threshold period of time.

7. The method of claim 1, wherein testing for the occurrence of the fatal error of the NTB comprises implementing a local read of a local NTB monitoring address in local memory, and implementing a peer write operation to a peer NTB monitoring address in peer memory.

8. A storage system, comprising:
    a first compute node, the first compute node having a first Peripheral Component Interconnect Express (PCIe) root complex, first CPU resources connected to the first PCIe root complex, and first memory resources connected to the first PCIe root complex;
    a second compute node, the second compute node having a second PCIe root complex, second CPU resources connected to the second PCIe root complex, and second memory resources connected to the second PCIe root complex;
    a PCIe Non-Transparent Bridge (NTB) interconnecting the first PCIe root complex and the second PCIe root complex; and
    one or more first storage devices storing first instructions that are operable, when executed by first CPU resources, to cause the first CPU resources to perform operations comprising:
    setting a core affinity for a first NTB monitoring process to require the first NTB monitoring process to execute on the first CPU resources connected to the first root complex;
    causing the first NTB monitoring process to sleep during normal operation until occurrence of a triggering event;
    implementing first atomic peer read operations, by the first CPU resources, on the second memory resources connected to the second PCIe root complex over the NTB;
    using a first atomicity algorithm configured to guarantee atomicity of the first atomic peer read operations to detect possible failure of the NTB; and
    using the detected possible failure of the NTB as the triggering event to cause the first NTB monitoring process to wake up to test for the occurrence of the fatal error of the NTB;
    wherein using the atomicity algorithm to detect possible failure of the NTB comprises reading a peer semaphore value on the peer compute node over the NTB; and
    wherein the peer semaphore is configured to have one or more prohibited values, the operations further comprising determining that the NTB has not failed in response to reading a value of the peer semaphore that is not one of the prohibited values.

9. The storage system of claim 8, wherein causing the first NTB monitoring process to wake up causes a first thread associated with the first NTB monitoring process to be scheduled to operate on the first CPU resources of the first root complex as specified by the core affinity for the first NTB monitoring process.

10. The storage system of claim 8, wherein the first instructions are further operable, in response to determining that the NTB has not failed, to cause the first NTB monitoring process to continue to sleep.

11. The storage system of claim 8, and wherein the first instructions are further operable to detect the possible failure of the NTB in response to receiving one of the prohibited values in response to reading the value of the first semaphore.

12. The storage system of claim 11, wherein the NTB is configured, upon occurrence of a NTB error, to return an error code to the first atomicity algorithm selected from one of the prohibited values, in response to reading the first semaphore by the atomicity algorithm.

13. The storage system of claim 8, wherein one of the triggering events is a failure to implement any atomic peer read operation on the second memory resources for a threshold period of time.

14. The storage system of claim 8, wherein first instructions are operable to cause the first NTB monitoring process to test for the occurrence of the fatal error of the NTB by implementing a first read of a first NTB monitoring address in the first memory resources, and implementing a first write operation to a second NTB monitoring address in the second memory resources.

15. The storage system of claim 8, further comprising:
one or more second storage devices storing second instructions that are operable, when executed by second CPU resources, to cause the second CPU resources to perform operations comprising:
setting a core affinity for a second NTB monitoring process to require the second NTB monitoring process to execute on the second CPU resources connected to the second root complex;
causing the second NTB monitoring process to sleep during normal operation until occurrence of a second triggering event;
implementing second atomic peer read operations, by the second CPU resources, on the first memory resources connected to the first PCIe root complex over the NTB;
using a second atomicity algorithm configured to guarantee atomicity of the second atomic read operations to detect possible failure of the NTB; and
using the detected possible failure of the NTB as the triggering event to cause the second NTB monitoring process to wake up to test for the occurrence of the fatal error of the NTB.

* * * * *